May 30, 1939.  L. J. HRUSKA  2,160,070

RECTIFIER SYSTEM

Filed June 24, 1937

Inventor
Leo J. Hruska
By
Attorney

Patented May 30, 1939

2,160,070

UNITED STATES PATENT OFFICE 2,160,070

RECTIFIER SYSTEM

Leo J. Hruska, Merchantville, N. J., assignor to Radio Corporation of America, a corporation of Delaware Application June 24, 1937, Serial No. 150,083

1 Claim. (Cl. 175—363)

The present invention relates to rectifier systems, and more particularly to rectifier systems for alternating currents, wherein a plurality of electric discharge rectifier devices are arranged to operate in parallel.

It is an object of the present invention to provide an improved rectifier system for the parallel operation of gaseous and similar rectifier devices therein, and in particular to permit the operation of such devices in parallel under varying loads, including a range of an operation below the threshold value of output current normally necessary for the proper functioning of electric discharge rectifiers.

In the operation of gaseous rectifier tubes of the type known as RCA-866A, in parallel, under conditions of low load, certain of the parallel connected tubes may cease to function or the load may be shifted rapidly from one set or pair of rectifiers to another, causing disturbances in the output current from the rectifier.

It is, therefore, a still further object of the present invention to provide an improved rectifier circuit for parallel gaseous rectifiers, which tends to maintain a uniform distribution of load on the several parallel connected rectifier devices.

The invention will further be understood from the following description, when considered in connection with the accompanying drawing, and its scope will be pointed out in the appended claim.

Figure 1:
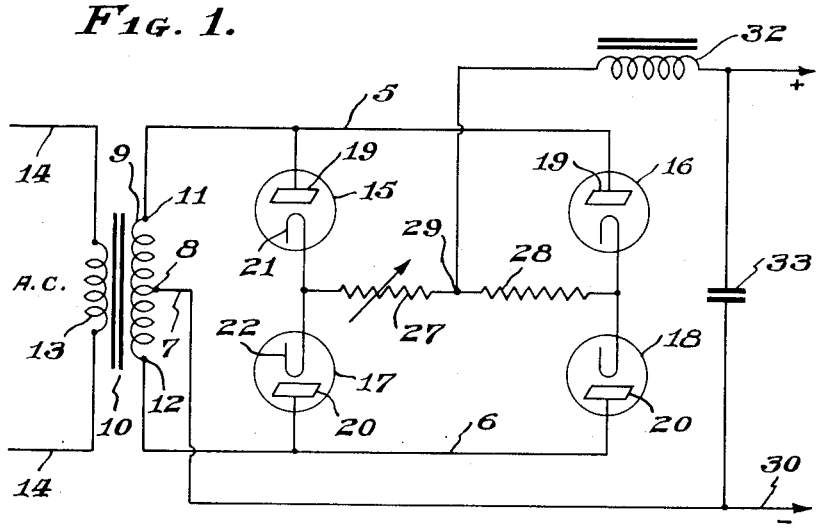
Figure 2:
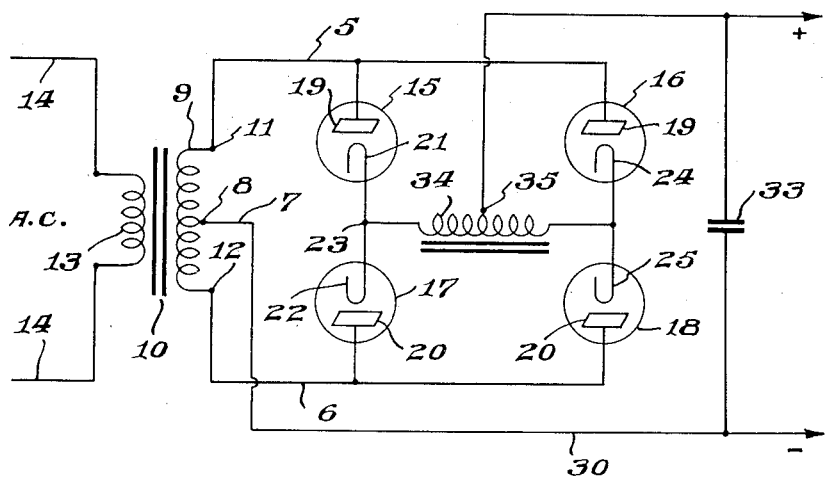

In the drawing, Figure 1 is a schematic circuit diagram of a rectifier system embodying the invention, and Figure 2 is a similar schematic circuit diagram showing a modification of the circuit of Fig. 1.

Referring to Fig. 1, a balanced alternating current supply circuit is indicated by the alternating current supply leads 5 and 6, which are connected in balanced relation to a center tap 8 on the secondary 9 of a power supply transformer 10. The terminals 11 and 12 of the secondary are connected with the leads 5 and 6, respectively, and the secondary as a supply winding receives energy from suitable means, such as a primary winding 13, through primary leads 14.

Four rectifier devices of electric discharge type are shown at 15, 16, 17 and 18, and are connected for full wave rectification and parallel operation between the power supply leads 5 and 6. The rectifiers 15 and 16 are provided with anodes 19 connected with the supply lead 5, while the anodes 20 of the rectifiers 17 and 18 are connected with the supply lead 6. The cathodes of rectifiers 15 and 17, indicated at 21 and 22, respectively, are connected together as indicated, at a common terminal 23, so that a shunt rectifier circuit across the supply circuit 5—6 is formed by the rectifiers 15 and 17 and connections therefor. In a similar manner, the cathodes 24 and 25 of the rectifiers 16 and 18 are connected together at a common terminal 26, whereby the rectifiers 16 and 18 and their connections provide a second shunt rectifier circuit, in parallel with the first rectifier circuit, across the supply leads 5—6.

The junctions of the cathodes 23 and 26 in the two rectifier circuits are connected through impedance means 27—28 having a tap 29 between its terminal ends. This preferably is a mid-tap. In the present example, the impedance means is in two equal resistance sections provided by a pair of series connected resistors, and the tap 29 is located at the connection between the two resistors.

In this manner, the two rectifier devices 15 and 16 are connected substantially in parallel at their cathodes and anodes to rectify the positive half of the alternating current cycle or wave, while the rectifiers 17 and 18 are likewise connected in parallel at their cathodes and anodes to rectify the negative half of the alternating current cycle or wave.

It will be noted that the impedance means 27—28 is included in circuit in such a manner that it operates as an impedance element in circuit with the rectifiers for both halves of the alternating current rectification, and provides substantially equal impedance in the path of the current flow through each of the first pair of rectifiers 15 and 16 on the positive half cycle and also substantially equal impedance in the path of the current flow through each of the second pair of rectifiers 17 and 18 on the negative half cycle. Stated in other words, the cathodes of each pair of parallel connected rectifiers are interconnected through the same impedance means, the latter being common to all four rectifiers in a common output circuit.

The output circuit is connected at the terminals 8 and 29, the former being on the alternating current supply circuit and the latter being on the common equalizing impedance. The output circuit is provided by a negative lead 30 and a positive output lead 31 in connection with which there may be provided a suitable filter such as a series choke coil 32 and a shunt filter capacitor 33.

With this method of parallel operation, the loads carried by the rectifier tubes, when operated in parallel, as shown, are equalized so that all tubes remain operative even at low load currents. For example, with gaseous tubes of the type hereinbefore referred to, parallel operation often causes the shunt rectifier circuits to draw current alternately. The shifting of the load current from one shunt circuit to the other causes the output current to be intermittent. With the present arrangement, all of the tubes take load current, even at relatively low loads, and the impedance means in circuit at 27—28 is relatively high with respect to the internal impedance of the rectifier devices, when carrying load current.

The present method of stabilizing a parallel connected rectifier system or equalizing the current flow has the advantage that individual stabilizing resistors or reactors for the various tubes are eliminated, and a single tapped resistor or impedance may be provided. Furthermore, the stabilizing or equalizing impedance is the same for both halves of the alternating current cycle, since it operates in the output circuit for both halves of the rectified wave. With gas type tubes of the RCA–866A type, a stabilzing impedance or resistor of substantially 100 ohms may be provided at 27—28 with a center tap, providing substantially 50 ohms on either side thereof. For practical purposes, this is best provided by two resistors connected in series, as shown.

In special cases, where it is desired to minimize the small power loss caused by the drop through the equalizing resistor, a tapped inductance may be provided, of less than one henry inductance. This may be connected in place of the resistor element 27—28, as shown in Fig. 2, to which attention is now directed and in which the same reference numerals are applied to like parts as in Fig. 1.

Referring to Fig. 2, the rectifier devices 15 and 16 and the rectifier devices 17 and 18 have the cathodes thereof interconnected through a tapped reactor or inductance element 34 in the same manner as provided by the resistor element in the figure previously described. The rectified current output circuit lead 31 is connected with a center tap terminal 35 on the reactor 34. The filter capacitor 33 operates in conjunction with said reactor as a filter for the output current. In this manner, the reactor not only operates to equalize the current from the alternately acting pairs of rectifiers, but also operates as a part of the output filter system for the rectifier.

As in the preceding system, alternating current through the transformer 10 is applied to the supply leads 5 and 6, and is rectified by the full wave operation of the rectifier devices. The direct current output is supplied to the output leads 30 and 31.

From the foregoing description, it will be seen that in accordance with the invention, the stabilizing or equalizing impedance element may be provided by a single device located between the cathodes of two parallel rectifier circuits arranged for full wave parallel rectification, and that the impedance means provides substantially equal impedance in the path of the current flow through each of the pairs of parallel connected rectifiers, whereby the impedance means is operative on both halves of the alternating current cycle in connection with the common output circuit of the rectifier system.

I claim as my invention:

In a full wave rectifier, the combination of alternating current transformer means having a balanced secondary circuit providing two output terminals and a balanced intermediate terminal, a pair of electric discharge rectifiers having anodes connected with one of said output terminals and cathodes connected together, for passing current in parallel during one half cycle of the secondary current, a second pair of electric discharge rectifiers having anodes connected with the other of said output terminals and cathodes connected together for passing current in parallel during the other half cycle of the secondary current, the cathode connection for the first pair of rectifiers being common to the cathode connection for the second pair of rectifiers and including a common series impedance means having a balanced intermediate terminal, said impedance means comprising a pair of substantially equal resistor devices connected in series, one of said devices being variable and said last named intermediate terminal being provided at the junction of said resistor devices, and means providing an output circuit connection with each of said intermediate terminals.

LEO J. HRUSKA.